(12) United States Patent
Osawa et al.

(10) Patent No.: US 11,701,769 B2
(45) Date of Patent: Jul. 18, 2023

(54) ELECTRIC WORKING TOOL

(71) Applicant: Yamabiko Corporation, Tokyo (JP)

(72) Inventors: Hisato Osawa, Tokyo (JP); Takeshi Maeno, Tokyo (JP); Satsuki Yuzuki, Tokyo (JP); Noriyuki Takeuchi, Tokyo (JP)

(73) Assignee: YAMABIKO CORPORATION, Tokyo (JP)

(*) Notice: Subject to any disclaimer, the term of this patent is extended or adjusted under 35 U.S.C. 154(b) by 273 days.

(21) Appl. No.: 16/992,573

(22) Filed: Aug. 13, 2020

(65) Prior Publication Data

US 2021/0046631 A1 Feb. 18, 2021

(30) Foreign Application Priority Data

Aug. 13, 2019 (JP) .............................. JP2019-148565

(51) Int. Cl.
*B25F 5/00* (2006.01)
*B25F 5/02* (2006.01)
*B01D 46/00* (2022.01)
*B27B 17/00* (2006.01)

(52) U.S. Cl.
CPC .......... *B25F 5/008* (2013.01); *B01D 46/0005* (2013.01); *B25F 5/02* (2013.01); *B27B 17/0008* (2013.01)

(58) Field of Classification Search
CPC ........ B25F 5/008; B25F 5/02; B01D 46/0005; B27B 17/0008; B27B 17/00; B28D 1/08; B28D 7/00
See application file for complete search history.

(56) References Cited

U.S. PATENT DOCUMENTS

| 3,313,964 A | * | 4/1967 | Mattson | ................. H02K 7/145 |
| | | | | 310/90 |
| 3,855,976 A | * | 12/1974 | Notaras | ................... B27B 17/00 |
| | | | | 123/41.62 |
| 9,138,884 B2 | | 9/2015 | Heinzelmann et al. | |
| 2005/0281627 A1 | | 12/2005 | Britz | |

(Continued)

FOREIGN PATENT DOCUMENTS

| CN | 103128719 A | * | 6/2013 | ......... B23Q 11/0046 |
| CN | 205310191 U | * | 6/2016 | |

(Continued)

OTHER PUBLICATIONS

EESR, European Patent Office, Oct. 20, 2019.

*Primary Examiner* — Hung Q Nguyen
(74) *Attorney, Agent, or Firm* — CRGO Global; Steven M. Greenberg

(57) ABSTRACT

A chainsaw (electric working tool) includes a body case; a cutting part (working implement); and a motor, wherein the motor is mounted in a cooling route in the body case; an intake communicating with the cooling route is opened on the body case; an air filter is housed between the intake and the cooling route; the body case has a filter insertion/extraction hole through which the air filter can be inserted and removed; the intake is opened on the outer surface of the body case; and the filter insertion/extraction hole is arranged at a portion other than that of the intake so that the motor can be efficiently cooled, dust hardly enters the cooling route, and maintenance can be easily performed.

9 Claims, 8 Drawing Sheets

(56) References Cited

U.S. PATENT DOCUMENTS

| | | | |
|---|---|---|---|
| 2009/0193669 A1* | 8/2009 | Gorenflo | B27B 17/083 30/277.4 |
| 2010/0122683 A1 | 5/2010 | Kawana et al. | |
| 2010/0218385 A1* | 9/2010 | Mang | B25F 5/008 30/298 |
| 2010/0218386 A1* | 9/2010 | Ro kamp | B27B 17/08 30/277.4 |
| 2010/0218966 A1* | 9/2010 | Liebhard | A01G 3/053 318/722 |

FOREIGN PATENT DOCUMENTS

| | | | | |
|---|---|---|---|---|
| CN | 206200673 U | * | 5/2017 | |
| CN | 207534578 U | * | 6/2018 | |
| DE | 102005062693 | | 7/2007 | |
| DE | 102006014819 A1 | * | 10/2007 | B27G 19/003 |
| DE | 102009015422 A1 | * | 10/2009 | B25F 5/008 |
| EP | 0345896 A2 | * | 12/1989 | |
| EP | 0579964 A1 | * | 1/1994 | |
| EP | 1961528 A1 | * | 8/2008 | B27B 17/08 |
| EP | 1477272 B1 | * | 10/2009 | B23Q 1/0009 |
| EP | 3109006 A1 | * | 12/2016 | B01D 46/0002 |
| FR | 2468430 A1 | * | 5/1981 | |
| GB | 2285757 | | 7/1995 | |
| JP | 2008173712 A | * | 7/2008 | B25F 5/00 |
| JP | 2010036260 | | 2/2010 | |
| JP | 2012200845 A | * | 10/2012 | |
| JP | 2016007680 | | 1/2016 | |
| JP | 2016007680 A | * | 1/2016 | |
| JP | 2016-093848 A | | 5/2016 | |
| JP | 2018-075669 A | | 5/2018 | |
| KR | 101370035 B1 | * | 3/2014 | |
| WO | WO-2009145206 A2 | * | 12/2009 | B25F 5/008 |
| WO | WO-2011114818 A1 | * | 9/2011 | B23Q 11/0046 |
| WO | WO-2011132514 A1 | * | 10/2011 | B25F 5/021 |
| WO | WO-2013032372 A1 | * | 3/2013 | A01G 3/053 |

* cited by examiner

FIG. 7
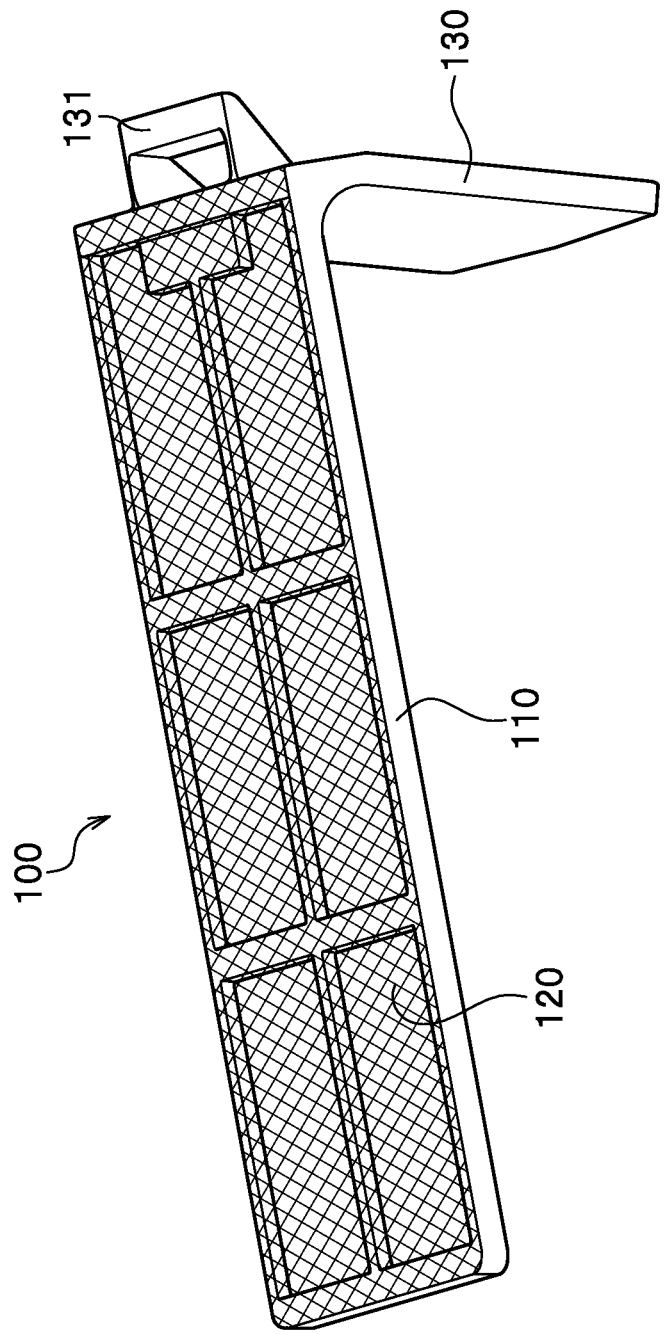
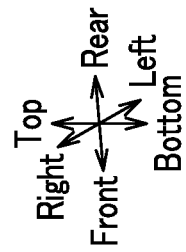

ELECTRIC WORKING TOOL

CROSS REFERENCE TO RELATED APPLICATIONS

The present application relates to and claims priority from Japanese patent application No. 2019-148565, filed on Aug. 13, 2019. The entirety of the contents and subject matter of all of the above is incorporated herein by reference.

BACKGROUND OF THE INVENTION

Field of the Invention

The present invention relates to an electric working tool.

Description of Related Art

Some electric chainsaws (one kind of electric work tools) are configured to have an intake opened in a body case, so that air is taken through the intake into a cooling route in the body case to cool a motor mounted in the cooling route (see, for example, Patent Document 1: U.S. Pat. No. 9,138,884).

SUMMARY OF THE INVENTION

Problem to be Solved

The above-mentioned conventional chainsaw has a problem that dust such as chips and fine particles generated during a cutting work easily enters the cooling route through the intake. Accumulation of the dust in the cooling route decreases efficiency of cooling the motor, and in some cases, decreases efficiency of driving the motor.

It is an object of the present invention to solve the above-mentioned problem and to provide an electric working tool capable of efficiently cooling a motor, preventing dust from entering the cooling route, and facilitating maintenance.

Solution to the Problem

In order to solve the above-mentioned problems, the present invention discloses an electric working tool comprising a body case, a working implement provided in the body case, and a motor for driving the working implement, wherein the motor is mounted in the cooling route in the body case. The body case has an intake communicating with the cooling route opened thereon, and an air filter housed between the intake and the cooling route. The body case has a filter insertion/extraction hole opened thereon, through which the air filter can be inserted and extracted, and the intake is opened on an outer surface of the body case, and the filter insertion/extraction hole is arranged at a portion other than that of the intake.

Effect of the Invention

In the electric working tool of the present invention, when air flows through the intake into the cooling route, the air filter removes dust existing in the air to prevent the dust from entering the cooling route, which facilitates maintenance of the electric working tool.

The electric working tool of the present invention is easy to maintain because the air filter is easy to attach to and detach from the body case through the filter insertion/extraction hole.

The electric working tool of the present invention is able to be configured with respect to a position and size of the intake in consideration of the efficiency of cooling the motor when the intake is located on the body case, because the filter insertion/extraction hole is arranged at a position other than the intake.

BRIEF DESCRIPTION OF THE DRAWINGS

FIG. 7 is a perspective view showing the air filter according to the embodiment of the present invention.

DETAILED DESCRIPTION OF THE INVENTION

A detailed description is given of an example of an embodiment of the present invention with reference to the drawings as appropriate.

The present embodiment is described using an example configuration, in which the present invention is applied to a chainsaw for cutting trees, boards, and the like. The description hereinbelow is given calling a cutting part of the chainsaw as a front portion of the chainsaw, and a top handle as a top portion.

Figure 1:
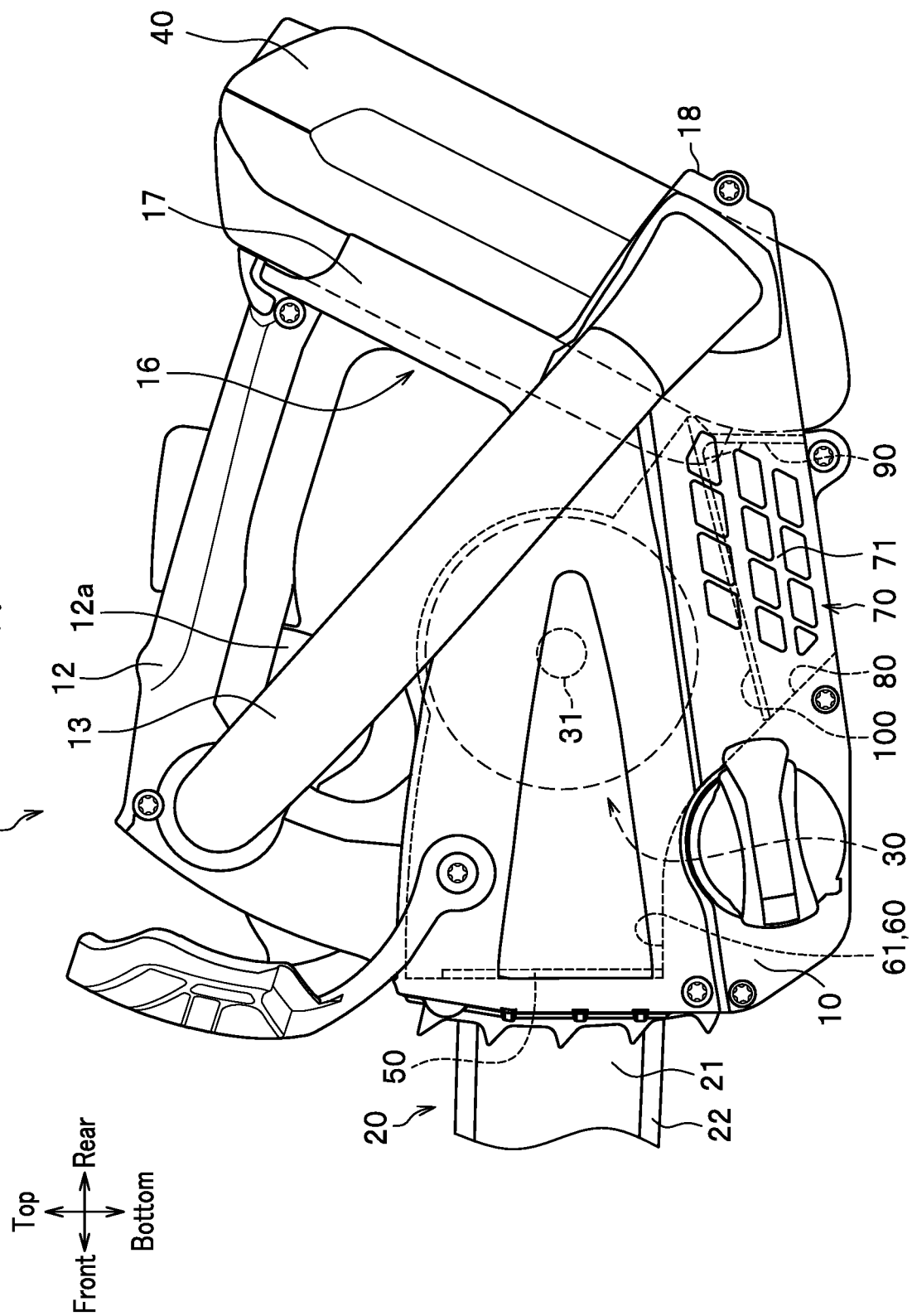
FIG. 1 is a side view showing a chainsaw according to an embodiment of the present invention.

As shown in FIG. 1, the chainsaw 1 of the present embodiment is provided with a body case 10, a cutting part 20 attached to the body case 10, a motor 30 driving the cutting part 20, a battery 40 supplying electric power to the motor 30, and a control board 50 controlling driving of the motor 30.

The body case 10 is a resin box. A top handle 12 is formed on a top surface of the body case 10. A side handle 13 extending from the front portion to a rear portion of the body case 10 is attached to a left side-surface of the body case 10.

The top handle 12 is a portion that an operator grips when holding the chainsaw 1. An operator's hand can be inserted into a space between the top handle 12 and the top surface of the body case 10.

The top handle 12 is provided with a trigger lever 12a, which is an operation means for regulating a rotation of a saw chain 22 while being gripped by an operator. The saw chain 22 is described below.

Figure 3:
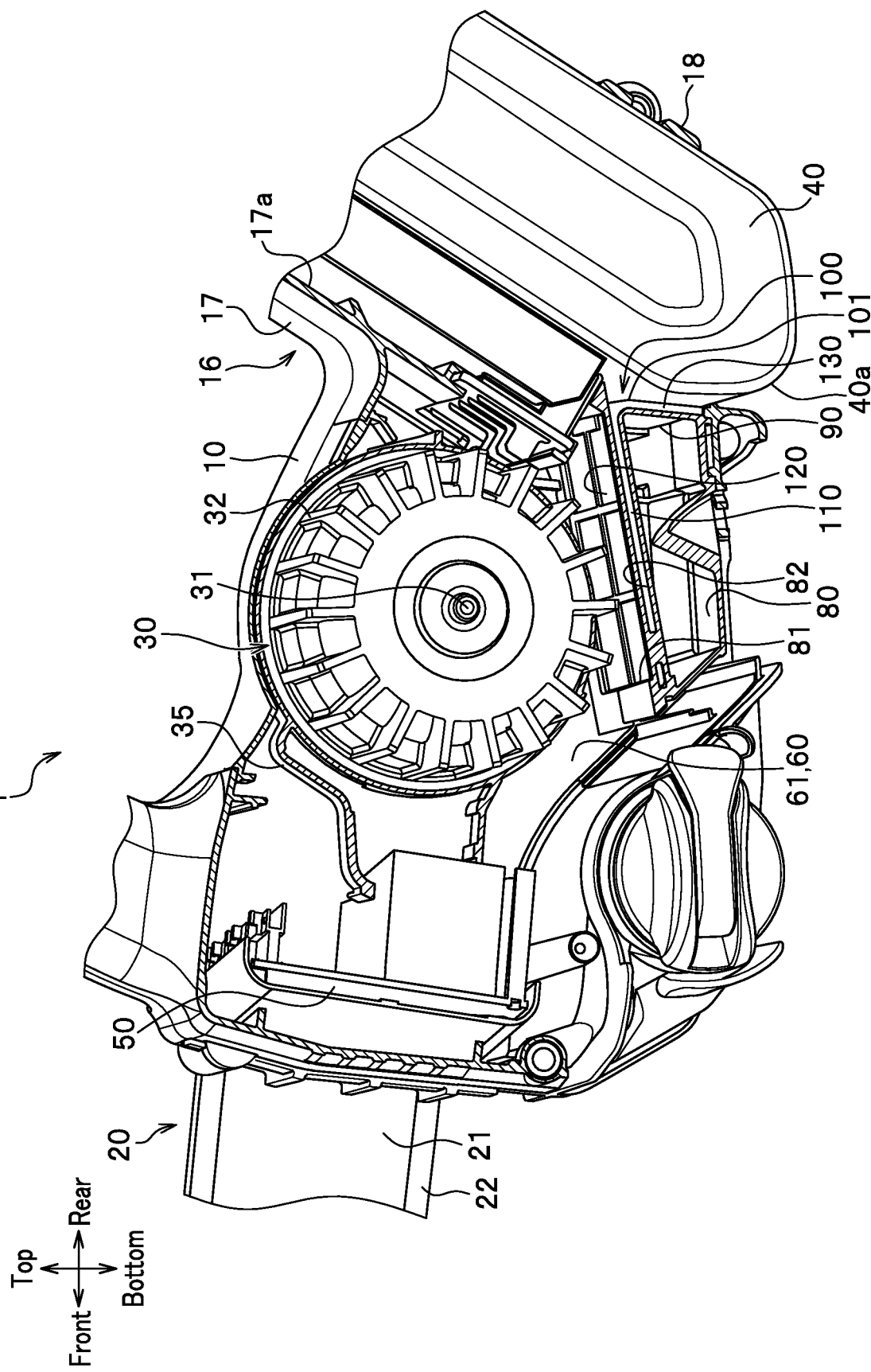
FIG. 3 is a sectional view showing an intake structure of the chainsaw according to the embodiment of the present invention.

As shown in FIG. 3, the body case 10 has a suction passage 61 formed therein, which is a part of a cooling route 60. The suction passage 61 is provided with a motor 30. The motor 30 is a well-known electric motor, and has an output shaft 31 extending in the right-left direction. To an end portion of the output shaft 31, a fan 32 is attached.

Figure 5:
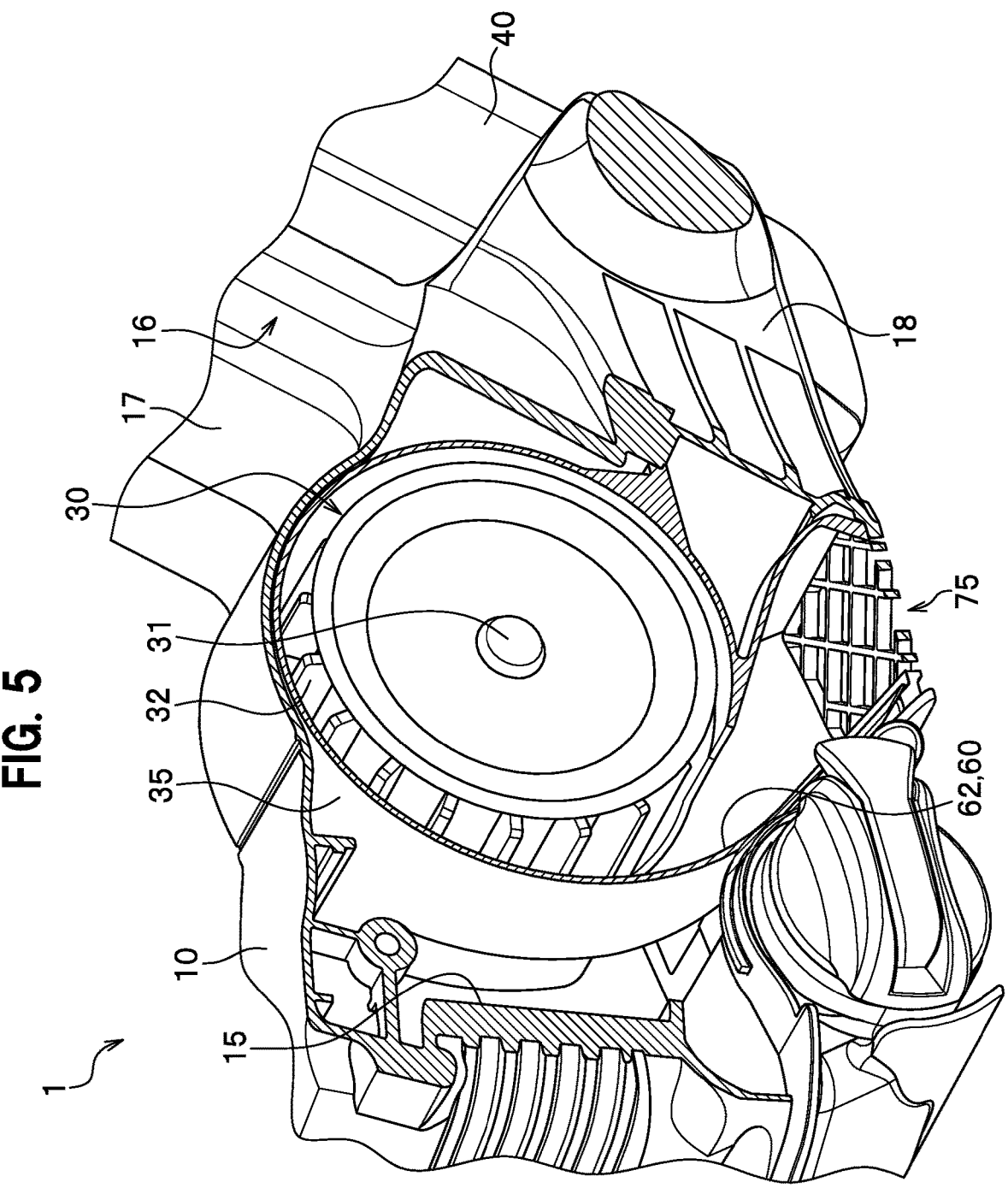
FIG. 5 is a cross-sectional view showing an exhaust structure of the chainsaw according to the embodiment of the present invention.

The motor 30 is housed in a motor case 35 provided in the body case 10, as shown in FIG. 5. The motor case 35 has an intake hole (not shown) opened on the right side thereof, and an exhaust passage 62 formed on a left side thereof. The exhaust passage 62 is another part of the cooling route 60 and communicates with an exhaust port 75 described below.

The cooling route 60 is provided with a control board 50 in addition to the motor 30, as shown in FIG. 3. The control board 50 is formed by mounting electronic components such as a CPU and a memory on a rectangular board on which an electronic circuit is printed. The control board 50 is electrically connected to the motor 30 through a cable (not shown).

The control board 50 is, with its two surfaces directed in front and back directions, housed on a front portion of the body case 10 and placed in front of the motor case 35 and the motor 30 in the suction passage 61.

Figure 2:
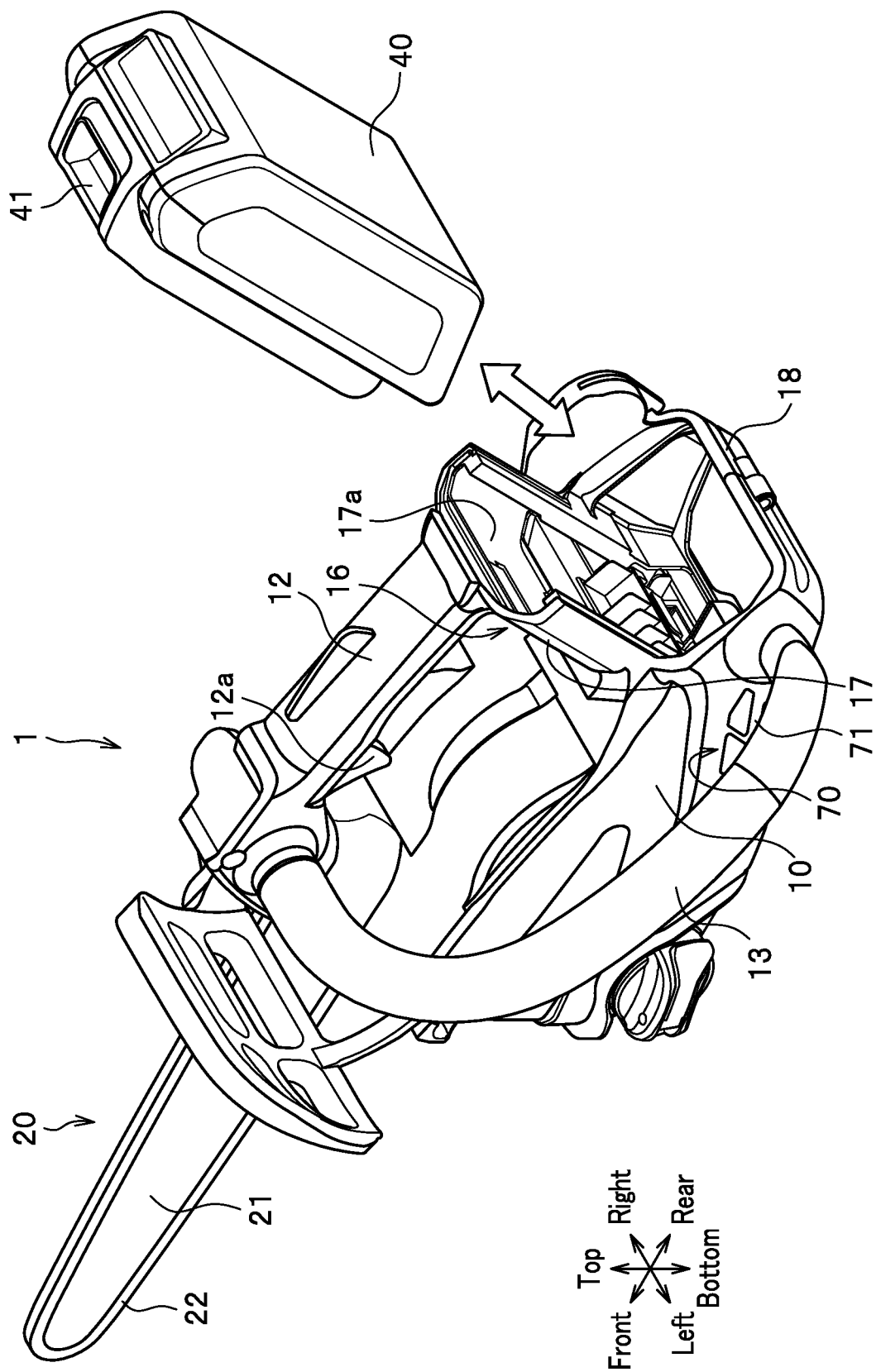
FIG. 2 is a perspective view of the chainsaw with a battery removed according to the embodiment of the present invention.

As shown in FIG. 2, the body case 10 is provided on its rear end surface with a battery attaching part 16 to which a battery 40 is detachably attached. The battery attaching part 16 has a holding portion 17 that holds the battery 40 and a battery case 18 that accommodates a lower portion of the battery 40.

The holding portion 17 is formed mainly by a rear end portion of the body case 10 and a plate-shaped portion extending upward from the rear end portion of the body case 10. The holding portion 17 is inclined so that its lower portion is arranged forward more than its upper portion (see FIG. 1).

A rear surface 17a of the holding portion 17 is an inclined surface that gradually inclines forward from the upper end to the lower end. The upper end of the holding portion 17 is connected to a rear end of the top handle 12. The rear surface 17a of the holding portion 17 is provided with an attachment/detachment mechanism for attaching the battery 40, and a connection terminal.

The battery 40 is a well-known kind of battery and accommodates a secondary battery such as a lithium ion battery in a vertically extending rectangular case. The battery 40 is provided on its top portion with a connecting lever 41 that engages with the top end of the holding portion 17.

As shown in FIG. 1, in a state in which the battery 40 is attached to the battery attaching part 16, the longitudinal side of the battery 40 is disposed along a vertical side of the body case 10.

A height of the battery 40 is larger than a height of the rear portion of the body case 10. In a state in which the battery 40 is fixed to the battery attaching part 16, a top end portion of the battery 40 projects above the rear end portion of the top handle 12. The battery 40 of the present embodiment has a sufficiently high output and large charge capacity enough for working.

When mounting the battery 40 on the battery attaching part 16, the battery 40 is slid downward with respect to the holding portion 17, and thereby the battery 40 is able to be mounted on the holding portion 17, as shown in FIG. 2. When the battery 40 is further pushed down, the connecting lever 41 of the battery 40 engages with the top end portion of the holding portion 17, which connects the battery 40 to the battery attaching part 16, as shown in FIG. 1. And the connection terminal provided on the rear surface 17a of the holding portion 17 is connected to a connection terminal of the battery 40. This connection supplies electric power from the battery 40 to the control board 50 and the motor 30.

When removing the battery 40 from the battery attaching part 16, pulling the connecting lever 41 releases the engagement of the holding portion 17 with the connecting lever 41 to allow the battery 40 to slide upward relative to the holding portion 17.

The battery case 18 is formed at the bottom end of the battery attaching part 16 as shown in FIG. 2. The battery case 18 is a cylindrical part that accommodates the lower portion of the battery 40.

The lower portion of the battery 40 is inserted through the top opening of the battery case 18. In a state in which the battery 40 is attached to the battery attaching part 16, the bottom end of the battery 40 projects downward from the bottom opening of the battery case 18, as shown in FIG. 1.

FIG. 2 shows the right portion of the body case 10 (see FIG. 4) provided with the cutting part 20 projecting forward. The cutting part 20 is a working implement for cutting work, and includes a guide bar 21 and a saw chain 22.

Figure 4:
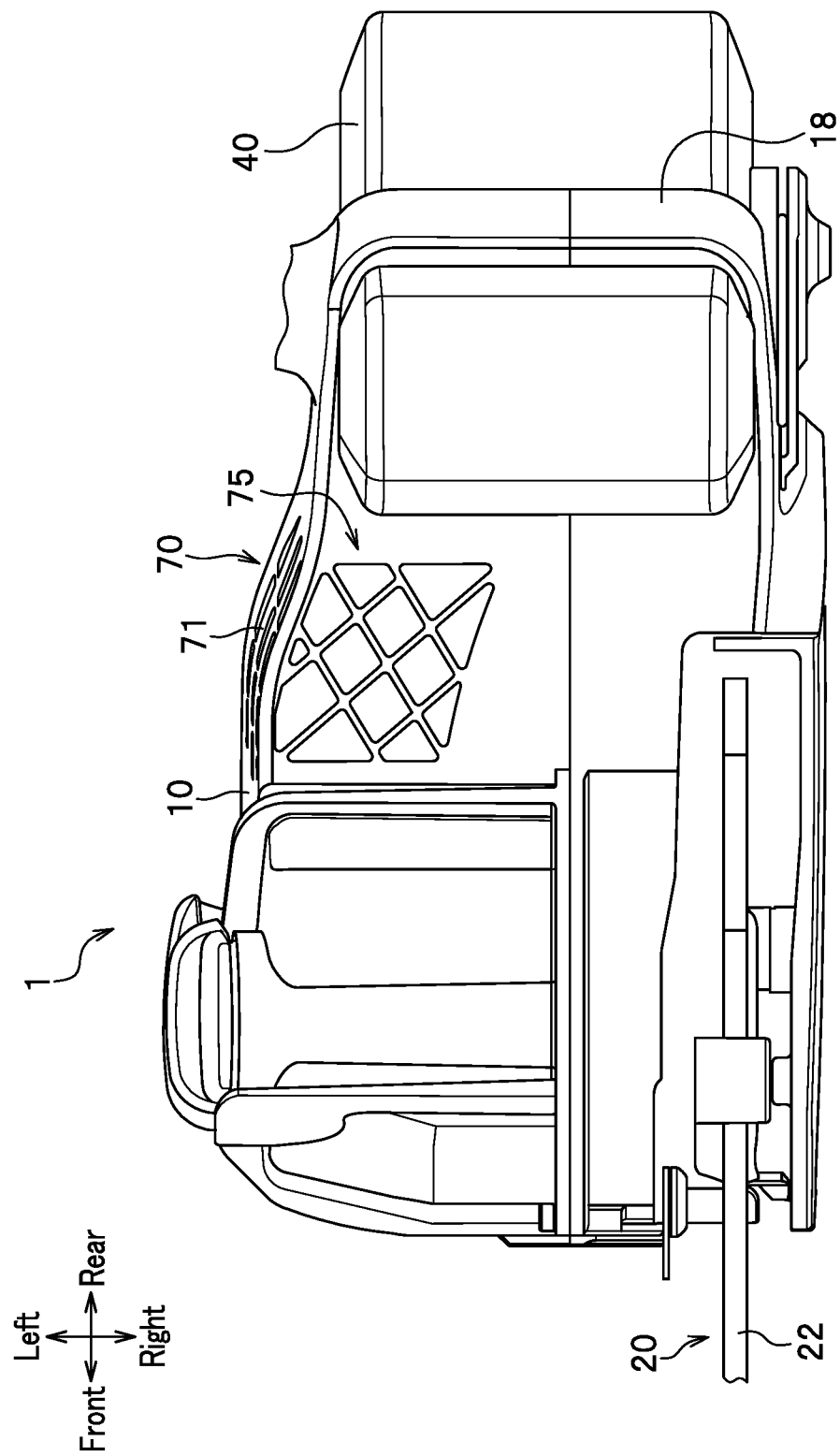
FIG. 4 is a bottom view showing the chainsaw according to the embodiment of the present invention.

The guide bar 21 is a plate-shaped member extending in the front-rear direction, and its rear end portion is attached to the right portion of the body case 10 (see FIG. 4).

The guide bar 21 is provided with an annular saw chain 22 wound around an outer periphery thereof. A rear end of the saw chain 22 is engaged with a drive gear connected to the output shaft 31 of the motor 30, as shown in FIG. 1.

When the motor 30 is driven to rotate a drive gear (not shown), the saw chain 22 rotates along an outer circumference of the guide bar 21.

When cutting a target object to be cut such as a tree or a plate with the chainsaw 1, an operator grips the top handle 12 with his right hand and the side handle 13 with his left hand, and carries the chainsaw 1.

When the operator pulls the trigger lever 12a, the motor 30 is driven so that the saw chain 22 rotates, and thereby the operator is able to cut the target object with the saw chain 22.

An intake 70 is opened on the bottom portion of the left side-surface of the body case 10. The cutting part 20 is arranged at the right portion of the body case 10, and the intake 70 is arranged at the left portion of the body case 10.

The intake 70 communicates through a retention chamber 80 with the suction passage 61 that is a part of the cooling route 60. The intake 70 is an opening for taking air from an external space into the suction passage 61.

The intake 70 has a reticular louver 7 formed thereon. The intake 70 is divided into a plurality of openings by the louver 71. The louver 71 makes it difficult for large dust to pass through the intake 70. Further, the louver 71 is formed in a shape such that air flows to be sucked therein from bottom to upward, which prevents dust that tends to fall in the gravity direction from entering the intake 70.

The retention chamber 80 is arranged at the lower portion of the body case 10 as shown in FIG. 3, particularly under the motor 30. The retention chamber 80 is defined by its bottom portion, and front, rear, right, and left walls within the body case 10. The top surface of the retention chamber 80 has a top opening 81 formed thereon. A left side-surface of the retention chamber 80 has an intake 70 (see FIG. 1) opened thereon.

The retention chamber 80 communicates with the external space through the intake 70, and also communicates with the suction passage 61 that is a part of the cooling route 60 through the top opening 81.

As shown in FIG. 4, the exhaust port 75 is opened on the bottom surface of the body case 10. The exhaust port 75, as shown in FIG. 5, communicates with the exhaust passage 62, which is a part of the cooling route 60, provided in the motor case 35. The exhaust port 75 is formed in mesh, and divided into a plurality of openings.

When the motor 30 is driven to rotate the output shaft 31 and in turn to rotate the fan 32 in the motor case 35, as shown in FIG. 3, air is sucked through an intake hole (not shown) of the motor case 35 into an inside of the motor case 35.

This causes a suction action in the suction passage 61 that is a part of the cooling route 60, and air is sucked from the external space through the intake 70 (see FIG. 1) and the retention chamber 80 into the suction passage 61.

Further, as shown in FIG. 5, the air in the motor case 35 is discharged through the exhaust passage 62 that is the part of the cooling route 60 and through the exhaust port 75 to the external space.

In the chainsaw 1 of the present embodiment, as shown in FIG. 1 and FIG. 3, air flows laterally from the intake 70 (see FIG. 1) into the retention chamber 80. Thereafter, the course of the air is bent from the lateral direction to an upward direction (bent at a right angle) in the retention chamber 80, and thereby the air changes its flow direction to flow through the top opening 81 of the retention chamber 80 into the suction passage 61.

The air flowing from the retention chamber 80 into the suction passage 61 flows through the front portion of the suction passage 61 and then into the suction passage 61 that is the part of the cooling route 60 in the motor case 35. At this time, the air flows around the control board 50 to cool it. As described above, the chainsaw 1 of the present embodiment is configured so that the air flowing from the external space into the body case 10 first cools the control board 50 and then the motor 30.

Figure 6:
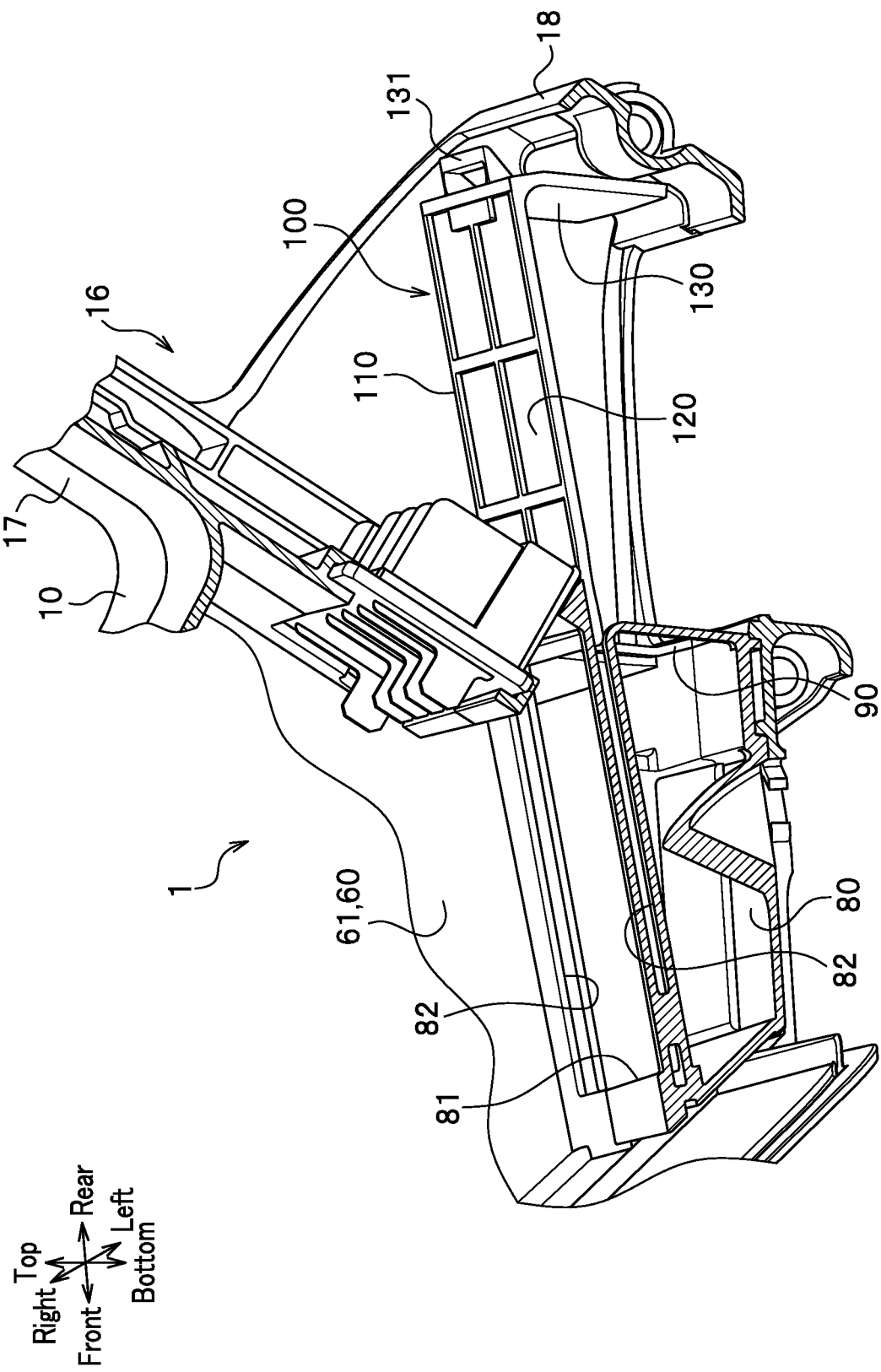
FIG. 6 is a cross-sectional view of the chainsaw with an air filter removed according to the embodiment of the present invention.

In the chainsaw 1 of the present embodiment, as shown in FIG. 6, a filter insertion/extraction hole 90 is opened at the battery attaching part 16. The filter insertion/extraction hole 90 is opened at the bottom portion of the rear surface 17a of the holding unit 17. Further, the filter insertion/extraction hole 90 is also opened on a rear surface of the retention chamber 80. The filter insertion/extraction hole 90 is an opening for getting an air filter 100 into and out of the retention chamber 80 as described below.

In the chainsaw 1 of the present embodiment, the intake 70 communicating with the retention chamber 80 is opened on the left side-surface of the body case 10 as shown in FIG. 1, and the filter insertion/extraction hole 90 communicating with the retention chamber 80 on the rear surface of the body case 10 as shown in FIG. 6. In this way, the body case 10 has the filter insertion/extraction hole 90 and the intake 70 arranged at different portions.

As shown in FIG. 3, in the state in which the battery 40 is attached to the battery attaching part 16, the filter insertion/extraction hole 90 is covered by the bottom end of the battery 40.

The chainsaw 1 of the present embodiment houses the air filter 100 at the top portion of the retention chamber 80. In this way, the air filter 100 is inserted into the body case 10 and arranged adjacent to the intake 70.

The top opening 81 of the retention chamber 80 is closed by the air filter 100. In this way, the air filter 100 is arranged between the intake 70 and the suction passage 61.

The air filter 100 removes dust in the air. The air filter 100, as shown in FIG. 7, includes a frame 110, a filter member 120 attached to the frame 110, a lid plate 130 protruding downward from a rear edge portion of the frame 110, which forms the air filter 100 in an L-shape in a side view.

The frame 110 has a quadrangular outer frame partitioned in a grid pattern inside the frame and has a plurality of openings formed thereon. The frame 110 is attached with a membrane-shaped filter member 120 having air permeability, and every opening of the frame 110 is closed by the filter member 120.

As shown in FIG. 6, grooves 82 extending in the front-rear direction are formed on inner surfaces of right and left end frames of the top opening 81 of the retention chamber 80. Then, right and left edges of the frame 110 of the air filter 100 are inserted into the two grooves 82 through the filter insertion/extraction hole 90, and the frame 110 is pushed forward so that the air filter 100 is inserted into the retention chamber 80, as shown in FIG. 3.

In the state of the air filter 100 being attached to the retention chamber 80, the top opening 81 is closed by the frame 110 and the filter member 120, this makes the retention chamber 80 arranged below the frame 110 and the filter member 120 of the air filter 100.

In the present embodiment, the air filter 100 is arranged under the motor 30, and further, a foremost portion 40a of the bottom end portion of the battery 40 and a rear end portion 101 of the air filter 100 overlap in the vertical direction.

In the present embodiment, when the air filter 100 is accommodated in the retention chamber 80, the frame 110 and the filter member 120 are inclined downward from the rear end toward the front end.

In this way, the air filter 100 of the present embodiment has the frame 110 and the filter member 120 inclined at an angle of 45 degrees or less with respect to a horizontal plane so as to avoid the bottom portion of the motor 30 (motor case 35).

As shown in FIG. 7, the lid plate 130 is a flat plate part extending downward from the rear edge of the frame 110. On an upper portion of the rear surface of the lid plate 130, a protrusion 131 is formed to protrude rearward.

As shown in FIG. 3, in the state in which the air filter 100 is fixed to the retention chamber 80, the lid plate 130 closes the filter insertion/extraction hole 90.

When attaching the air filter 100 to the body case 10, the operator removes the battery 40 (see FIG. 2) from the battery attaching part 16 to expose the filter insertion/extraction hole 90, as shown in FIG. 6.

Then, the operator pushes the frame 110 of the air filter 100 through the filter insertion/extraction hole 90 into the retention chamber 80.

When the air filter 100 is pushed into the retention chamber 80 up to a position where the lid plate 130 closes the filter insertion/extraction hole 90 as shown in FIG. 3, the top opening 81 of the retention chamber 80 is closed by the frame 110 and the filter member 120.

Further, when the battery 40 is attached to the battery attaching part 16, an outside of the lid plate 130 is covered by the bottom portion of the battery 40. This prevents the air filter 100 from being removed off from the filter insertion/extraction hole 90 during the operator works.

When removing the air filter 100 from the body case 10, the operator removes the battery 40 from the battery attaching part 16, and thereby exposes the lid plate 130 of the air filter 100 to outside, as shown in FIG. 6.

Then, the operator pulls the protrusion 131 of the lid plate 130 rearward to pull out the air filter 100 from the retention chamber 80, and thereby removes the air filter 100 from the body case 10.

The above-described chainsaw 1 (electric working tool) includes the body case 10, the cutting part 20 (working implement) equipped in the body case 10, and the motor 30 driving the cutting part 20, as shown in FIG. 1. The motor 30 is mounted in the cooling route 60 in the body case 10.

The body case 10 has the intake 70 communicating with the cooling route 60 opened thereon. Between the intake 70 and the cooling route 60 is housed the air filter 100. The body case 10 has a filter insertion/extraction hole 90 through which the air filter 100 is able to be freely inserted and extracted. The intake 70 is open on the outer surface of the body case 10. Further, the filter insertion/extraction hole 90 is arranged at a position different from that of the intake 70.

In the chainsaw 1 of the present embodiment, when air flows into the cooling route 60 through the intake 70, the air filter 100 removes dust in the air to suppress the dust from entering the cooling route 60. This reduces a frequency of maintenance of an inside of the body case 10, and cleaning of the chainsaw 1 is able to be facilitated.

In the chainsaw 1 of the present embodiment, the air filter 100 can be easily attached to and detached from the body case 10 through the filter insertion/extraction hole 90, so that the air filter 100 can be easily cleaned.

In the chainsaw 1 of the present embodiment, because the intake 70 and the filter insertion/extraction hole 90 are arranged at different positions, there is no need to determine a position and size of the intake 70 in accordance with a shape and mounting structure of the air filter 100, and the position and size of the intake 70 can be configured in consideration of cooling efficiency of the control board 50 and the motor 30 without being affected by the shape and the mounting structure of the air filter 100.

In the chainsaw 1 of the present embodiment, the body case 10 is able to be compact by accommodating the air filter 100 required to be air permeable in the body case 10 and arranging the air filter 100 adjacent to the intake 70. Further, the body case 10 is able to be made compact by housing the air filter 100 in the retention chamber 80 accommodated in the body case 10 and arranging the air filter 100 adjacent to the intake 70. Furthermore, the dust in the air that enter through the intake 70 can be accumulated in the retention chamber 80 and discharged from the retention chamber 80 by removing the air filter 100. Furthermore, the chainsaw 1 of the present embodiment may have a structure that makes it difficult for the dust in the air to adhere to the air filter 100.

In the chainsaw 1 of the present embodiment, as shown in FIG. 3, the filter member 120 of the air filter 100 is housed in the upper portion of the retention chamber 80, which means that a space is secured under the filter member 120.

This configuration makes the air entering through the intake 70 pass through the retention chamber 80 and then reach the air filter 100, and therefore the dust in the air is not able to easily adhere to the air filter 100. This causes the air filter 100 to suck the air from the lower position to the upper position and therefore the air filter 100 is hard for the dust to enter. In particular, the retention chamber 80 is located under the air filter 100, this could cause the dust adhering to the air filter 100 to easily fall off the air filter 100 and the air filter 100 to be hard to be dirty. Further, because the air filter and the intake 70 are arranged lower than the chainsaw 1, the dust can be accumulated below the chainsaw 1.

In particular, in the present embodiment, the air laterally flowing through the intake 70 into the retention chamber 80 is changed to be bent in its flow direction from horizontal to vertical in the retention chamber 80 (bent in its direction at a right angle) to reach the air filter 100, and therefore, the air filter 100 is able to be effectively prevented from being adhered by the dust.

Further, in this configuration, dust attaching to the air filter 100 is easily dropped due to an impact when the chainsaw 1 is placed on a floor surface or a vibration during cutting work, which allows lengthening an interval between cleanings or replacements of the air filter 100.

In the chainsaw 1 of the present embodiment, as shown in FIG. 1, the intake 70 is opened on the side surface of the body case 10, and the air filter 100 is adjacent to the intake 70, and therefore, a vacant space on the side surface of the body case 10 can be effectively used for other purposes. Further, because the air filter 100 is arranged under the motor 30, which allows further effective use of the empty space on the side surface of the body case 10. Furthermore, when the air filter 100 is arranged in front of the bottom portion of the battery 40, more empty space on the side surface of the body case 10 can be effectively used. In this way, the body case 10 is able to be formed to be compact.

In the chainsaw 1 of the present embodiment, the air filter 100 is arranged under the motor 30 to effectively use the empty space under the motor 30 in the body case 10, which allows forming the body case 10 in a compact manner. Further, because the motor 30 and the air filter 100 are arranged to be vertically overlapped, the body case 10 can be made more compact. Furthermore, as shown in FIG. 3, the frame 110 and the filter member 120 are inclined with respect to the horizontal plane so as to avoid the bottom portion of the motor 30 (motor case 35), this can make the body case 10 more compact.

Furthermore, as shown in FIG. 1, the chainsaw 1 of the present embodiment is provided with a battery 40 that supplies electric power to the motor 30, and has the air filter 100 arranged in front of the bottom portion of the battery 40 to effectively use an empty space in front of the bottom part of the battery 40 inside the body case 10, which allows the body case 10 to be formed in a compact manner. Furthermore, because the forefront portion of the bottom end of the battery 40 and the rear end of the air filter 100 vertically overlap, the body case 10 can be made more compact.

Furthermore, because the empty space in front of the bottom portion of the battery 40 under the motor 30 in the body case 10 is effectively used, the body case 10 can be made more compact.

The above-described configuration allows an effective utilization of the space in front of the battery 40 and under the motor 30 to arrange the air filter 100, and therefore, allows the body case 10 to be made compact.

The chainsaw 1 of the present embodiment, as shown in FIG. 3, houses the control board 50 for controlling the drive of the motor 30 in front of the motor 30 in the body case 10; and is provided with the intake hole (not shown) of the motor case 35 near the control board 50.

Such a configuration allows the air flowing exclusively (hermetically) through the intake 70 into the suction passage 61 (air that is flowed exclusively for cooling) to enter surroundings of the control board 50 (a place to be especially cooled such as a cooling fin mounted on the control board 50), and thereafter allows the fan 32 mounted in the motor 30 to suck the air, which cause the control board 50 to be effectively cooled. Further, because the air filter 100 is mounted in the empty space under the motor 30 and in front of the bottom portion of the battery 40 and the control board 50 is housed in front of the motor 30, the body case 10 can be compactly formed, which means that each part in the body case 10 is well laid out.

In the chainsaw 1 of the present embodiment, the battery 40 can be freely attached to and detached from the body case 10, and the filter insertion/extraction hole 90 is covered by the battery 40 when the battery 40 is attached to the body case 10.

The above configuration allows the filter insertion/extraction hole 90 to be covered by the battery 40 by attaching the battery 40 on the body case 10, and therefore, allows forming the filter insertion/extraction hole 90 in a simple structure. Further, this configuration utilizes a component mounted for another purpose (battery 40) for opening and closing the filter insertion/extraction hole 90, and therefore no new component is needed. Furthermore, some modifications of the present embodiment may be configured to close the filter insertion/extraction hole 90 with the battery 40 so as to prevent air from being sucked through the filter insertion/extraction hole 90. Such a structure is able to take only the air passing through the air filter 100 into the body case 10 as much as possible. In addition, some modifications may be configured to press down the air filter 100 with the battery 40, so that the air filter 100 may be prevented from falling off with a simple configuration.

The air filter 100 of the present embodiment includes the frame 110 to which the filter member 120 is attached. And the frame 110 has the lid plate 130 extending in the vertical direction formed, and the lid plate 130 closes the filter insertion/extraction hole 90. This configuration is able to make it hard to suck air through the filter insertion/extraction hole 90 by closing the filter insertion/extraction hole 90 with the lid plate 130. In addition, some cases are able to use the lid plate 130 for positioning with respect to the body case 10. Further, because the filter insertion/extraction hole 90 is closed by the lid plate 130, the filter insertion/extraction hole 90 can be widely opened, and this configuration allows the air filter 100 to be easily attached and detached. Furthermore, some modified configurations is able to make the lid plate 130 project rearward and to remove the air filter 100 from the body case 10 as shown in FIG. 6, so that the dust in the retention chamber 80 can be easily discharged through the filter insertion/extraction hole 90.

In the chainsaw 1 of the present embodiment, as shown in FIG. 4, the cutting part 20 is arranged at the right portion (a first portion) of the body case 10, and the intake 70 is opened on the lower portion of the side surface of the left portion (a second portion) of the body case 10, and therefore, the chips generated by the cutting part 20 is suppressed from flowing into the intake 70.

In the chainsaw 1 of the present embodiment, as shown in FIG. 5, the exhaust port 75 communicating with the exhaust passage 62 that is the part of the cooling route 60 opens on the bottom surface of the body case 10. This configuration allows preventing the air discharged from the exhaust port 75 from blowing to the worker. Further, this configuration has the intake 70 opened on the right or left side-surface of the body case 10, the air filter 100 mounted under the motor 30, and the exhaust port 75 opened on the bottom surface of the main case 10 under the motor 30, and therefore the body case 10 can be formed compactly.

Although an above description is given of the example of the embodiment of the present invention, the present invention is not limited to the above-described embodiment, and may be appropriately modified within a scope of the invention.

In the present embodiment, as shown in FIG. 4, although the intake 70 is opened in the lower portion of the left side-surface of the body case 10, the position and size of the intake are not limited thereto. For example, the intake may be opened on the right side-surface or the bottom surface of the body case 10.

In the present embodiment, although the air filter 100 is disposed under the motor 30 as shown in FIG. 3, the arrangement and shape of the air filter 100 are not limited thereto. For example, the air filter 100 may be disposed in the front, rear, right, left, or upper space of the motor 30.

Further, in the present embodiment, the air filter 100 is housed in the top portion of the retention chamber 80, but the housing position of the air filter 100 is not limited thereto. In the present embodiment, the filter insertion/extraction hole 90 is covered by the detachable battery 40 attached on the outer surface of the body case 10. However, the shape and structure of a member for covering the filter insertion/extraction hole 90 are not limited thereto.

Figure 8:
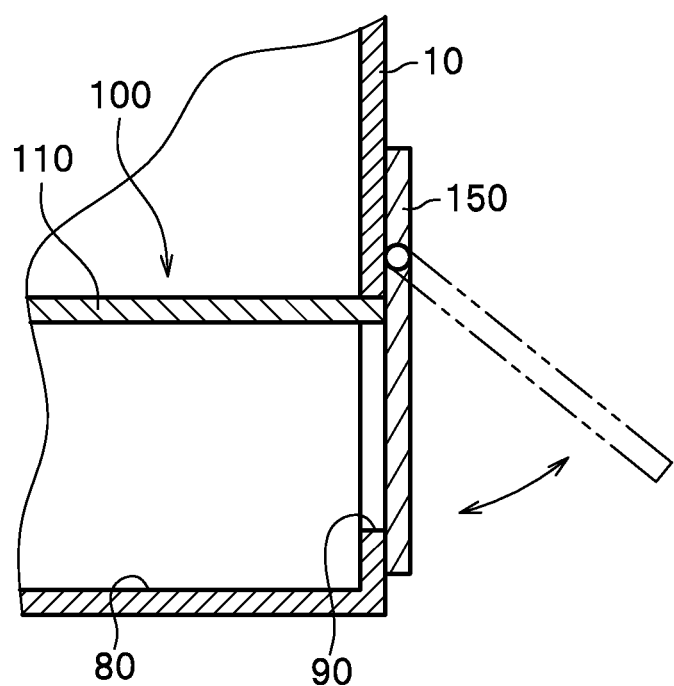
FIG. 8 is a cross-sectional view showing a modified example of the chainsaw and showing a configuration having an opening/closing member according to the embodiment of the present invention.

For example, as shown in FIG. 8, an opening/closing member 150 that can be freely openable and closable is provided on the outer surface of the body case 10, and closing the opening/closing member 150 may allow it to cover the filter insertion/extraction hole 90. In addition, it is preferable that the opening/closing member 150 is freely attachable and detachable from the body case 10. This configuration allows the opening/closing member 150 to easily cover the filter insertion/extraction hole 90. Some modifications of the embodiment may be configured to need no lid plate for closing the filter insertion/extraction hole 90.

In the present embodiment, as shown in FIG. 1, the intake 70 communicates with the cooling route 60 through the retention chamber 80, but the retention chamber 80 may not be provided within the body case 10.

In the present embodiment, although the control board 50 is located in front of the motor 30, the arrangement of the motor 30 and the control board 50 in the body case 10 is not limited thereto. Further, in the present embodiment, although the control board 50 is provided in the suction passage 61 that is the part of the cooling route 60, the control board 50 may be provided in the exhaust passage 62 (see FIG. 5) that is other part of the cooling route 60 . . . .

The present embodiment is provided with the cylindrical battery case 18 as shown in FIG. 2, the battery case 18, however, may not be provided.

The present embodiment uses the high voltage battery 40 (40 V or higher, preferably 50 V or higher, more preferably 60 V or higher) in the chainsaw 1, as shown in FIG. 1; however, its heat loss due to current is small, and therefore, the chainsaw 1 needs no intended structure for flowing cooling air from the motor 30 to the battery 40 to secure a good work environment. Further, this embodiment is able to direct the flow of the cooling air generated by the motor 30 intensively to the control board 50, the motor 30 and the like by adopting the high voltage battery 40, and therefore, a possibility of a problem due to heat in the control board 50, the motor 30 and the like is able to be minimized.

The present embodiment describes the chainsaw 1 applied with the present invention, but the present invention is not limited to be applied thereto, but may be applied to various types of electric working tools such as brush cutters, hedge trimmers, blowers and the like. When cutting wood or the like with a chainsaw applied with the present invention, the present invention is able to prevent lubricant of a working tool, oil contained in wood, wood facet containing water, and the like from entering the body case of the working tool.

What is claimed is:

1. An electric working tool comprising:
a body case;
a working implement provided in the body case; and
a motor for driving the working implement,
wherein
the motor is mounted in a cooling route in the body case;
the body case includes an intake communicating with the cooling route opened thereon;
an air filter is housed between the intake and the cooling route;
the body case includes a filter insertion/extraction hole opened thereon, the air filter being able to be inserted/extracted through the filter insertion/extraction hole;
the intake is open on an outer surface of the body case; and
the filter insertion/extraction hole is disposed at a portion other than that of the intake, and
wherein
the electric working tool further comprises a battery that supplies electric power to the motor;
the air filter is disposed in front of the battery;
the battery is attachable to and detachable from the body case; and,
the filter insertion/extraction hole is covered by the battery when the battery is attached to the body case.

2. The electric working tool according to claim 1, wherein the air filter is disposed adjacent to the intake inside the body case.

3. The electric working tool according to claim 2, wherein the working implement is disposed at a first one of right and left portions of the body case; and the intake is arranged at a second one of the right and left portions of the body case.

4. The electric working tool according to claim 1, wherein the air filter is disposed under the motor.

5. The electric working tool according to claim 4, wherein a control board controlling drive of the motor is accommodated in front of the motor in the body case.

6. The electric working tool according to claim 4, wherein the intake is open on a right or left side surface of the body case as viewed in a right/left direction.

7. The electric working tool according to claim 6, wherein the intake is opened at a lower portion of the side surface.

8. The electric working tool according to claim 1, wherein the intake is open on a right or left side surface of the body case as viewed in a right/left direction.

9. The electric working tool according to claim 1, wherein the working implement is disposed at a first one of right and left portions of the body case; and the intake is arranged at a second one of the right and left portions of the body case.

* * * * *